United States Patent [19]

Kumasaka et al.

[11] Patent Number: 4,881,756
[45] Date of Patent: Nov. 21, 1989

[54] VEHICLE STRUCTURE, ESPECIALLY CHASSIS FRAME STRUCTURE

[75] Inventors: Hideyuki Kumasaka, Yokohama; Kouji Takao, Atsugi; Hiroshi Kuriyama, Yokohama, all of Japan

[73] Assignee: Nissan Motor Co., Ltd., Yokohama, Japan

[21] Appl. No.: 154,406

[22] Filed: Feb. 10, 1988

[30] Foreign Application Priority Data

Feb. 10, 1987 [JP] Japan .................................. 62-29051
Feb. 25, 1987 [JP] Japan ............................. 62-26892[U]
Feb. 25, 1987 [JP] Japan .................................. 62-42380

[51] Int. Cl.$^4$ ........................................... B62D 21/12
[52] U.S. Cl. .................... 280/785; 296/196; 296/197
[58] Field of Search ................. 280/785; 296/196, 197

[56] References Cited

U.S. PATENT DOCUMENTS

| 2,389,907 | 12/1941 | Helmuth | 296/28 |
| 2,425,948 | 8/1947 | Lucien | 296/196 |
| 2,700,570 | 1/1955 | Barenyi | 296/196 |
| 2,964,331 | 12/1960 | Sherman | 280/106 |
| 2,988,397 | 9/1956 | Brueder | 296/28 |
| 3,022,105 | 9/1959 | Tjaarda | 296/28 |
| 4,422,685 | 12/1983 | Bonfilio et al. | 296/197 |
| 4,533,172 | 8/1985 | Oliver | 296/185 |
| 4,573,734 | 3/1986 | Gross | 296/196 |
| 4,590,654 | 5/1986 | Kajiura | 29/407 |
| 4,613,184 | 9/1986 | Rispeter et al. | 280/785 |
| 4,759,489 | 7/1988 | Pigott | 228/102 |

FOREIGN PATENT DOCUMENTS

| 142581 | 5/1985 | European Pat. Off. . |
| 178266 | 4/1986 | European Pat. Off. . |
| 240470 | 10/1987 | European Pat. Off. . |
| 2117414 | 10/1972 | Fed. Rep. of Germany . |
| 3119666 | 1/1982 | Fed. Rep. of Germany . |
| 3119572 | 3/1982 | Fed. Rep. of Germany . |
| 701413 | 12/1953 | United Kingdom . |
| 1337555 | 11/1973 | United Kingdom . |
| 1488793 | 10/1977 | United Kingdom . |
| 2142588 | 1/1985 | United Kingdom . |
| 87/03846 | 7/1987 | World Int. Prop. O. . |

OTHER PUBLICATIONS

Automotive Engineering, Feb. 1985; pp. 96–102.
Automotive Engineering, Mar. 1983; pp. 50–52.
The Engineer (Great Britain), Nov. 26, 1987; pp. 54–55.
VW—new Audi 80, Document designated (4).
New Audi 80, Document designated (5).
Automotive Industries, Feb. 1986; Document designated (6).
Modular Vehicle Body Used in Opel Omega, Document designated (7).
Japanese Provisional Patent Publication No. 61—92965, 5/1986; Document designated (8).
Japanese Provisional Utility Model Publication No. 62—102772, 6/1987; Document designated (9).
Japanese Provisional Utility Model Publication No. 62—80766, 5/1987; Document designated (10).
Module Vehicle Body According to Honda, cited from Japanese Patent Publications No. 62—88674, No. 62—88676, and No. 62—88678; Document designated (11).
Japanese Provisional Utility Model Publication No. 62—102780, 6/1987; Document designated (12).
Japanese Provisional Utility Model Publication No. 62-102771, 6/1987; Document designated (13).
Japanese Provisional Utility Model Publication No. 62—102769, 6/1987; Document designated (14).
Japanese Provisional Utility Model Publication No. 62—102781, 6/1987; Document designated (15).

Primary Examiner—Kenneth R. Rice
Attorney, Agent, or Firm—Foley & Lardner, Schwartz, Jeffery, Schwaab, Mack, Blumenthal & Evans

[57] ABSTRACT

A vehicle frame consists of three longitudinally separate frame sections, i.e., a front frame section, center frame section and a rear frame section. The frame sections are manufactured and assembled in the respective independent lines and painted and equipped with chassis sub-assemblies independently, whereby to constitute a front frame module, center frame module and a rear frame module, respectively. The frame modules are finally bolted together to constitute a complete chassis.

13 Claims, 5 Drawing Sheets

VEHICLE STRUCTURE, ESPECIALLY CHASSIS FRAME STRUCTURE

BACKGROUND OF THE INVENTION

1. Field of the Invention

The present invention relates in general to vehicle structures and more particularly to an underbody frame or chassis frame structure for an automotive vehicle.

2. Description of the Prior Art

Unitized bodies have been used for many of automobiles, particularly most of passenger cars. The conventional unitized bodies however have a difficulty in installation of components and inspection of same since access to the spaces for disposition of the components is obstructed by the body sections enclosing the spaces.

A body construction of the type having a separate frame can solve the above problem to some extent but not satisfactorily.

SUMMARY OF THE INVENTION

In accordance with the present invention, there is provided a novel chassis structure which is constituted by three frame modules, i.e., a front frame module, a center frame module and a rear frame module.

The front frame module has a front frame section and chassis sub-assemblies including an engine, wheels and a suspension system. The front frame section has at the front end thereof bracket means.

The rear frame module has a rear frame section and chassis sub-assemblies including wheels and a suspension system. The rear frame section has at the front end thereof bracket means.

The center frame module has a center frame section and is interposed between the front and rear frame modules. The center frame section has at the front and rear ends thereof bracket means respectively joined with the bracket means at the rear and front ends of the front and rear frame sections.

The bracket means of the center frame module are mechanically fastened to the bracket means of the front and rear frame modules.

In accordance with the present invention, there is also provided a novel method of producing a chassis for an automotive vehicle.

The method comprises preparing front, center and rear frame sections which are separate from each other, painting the front, center and rear frame sections, installing chassis sub-assemblies on the front, center and rear frame sections, and mechanically fastening the front, center and rear frame sections to each other.

This structure is quite effective for solving the above noted problems inherent in the prior art structures.

It is accordingly an object of the present invention to provide a novel chassis structure which can be produced with ease and efficiency.

It is another object of the present invention to provide a novel chassis structure of the above described character which makes it possible to attain the installation and insepection of chassis sub-assemblies with ease and efficiency.

It is a further object of the present invention to provide a novel chassis structure of the above described character which can reduce the assembling expense considerably.

It is a further object of the present invention to provide a novel chassis structure which is suited for manufacture and assembly using robots.

It is a further object of the present invention to provide a novel chassis structure of the above described character which makes it possible to produce various types of vehicles with ease and efficiency.

It is a further object of the present invention to provide a vehicle structure using a vehicle chassis of the above described character.

It is a further object of the present invention to provide a method of producing a chassis structure which is of the above described character.

DETAILED DESCRIPTION OF THE PREFERRED EMBODIMENTS

Figure 1:
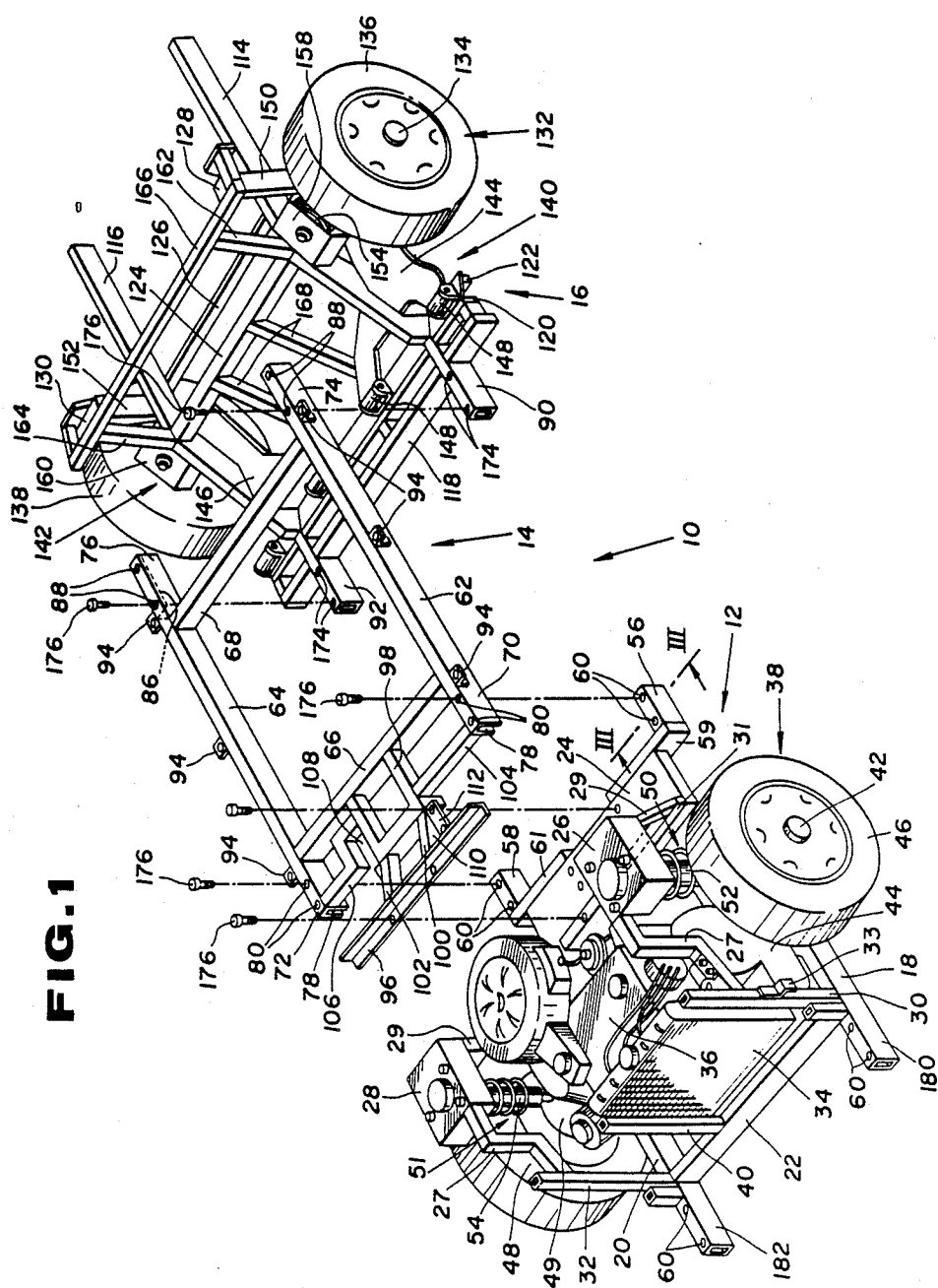
FIG. 1 is a perspective, partially exploded view of a vehicle frame with chassis sub-assemblies according to an embodiment of the present invention.
Figure 2:
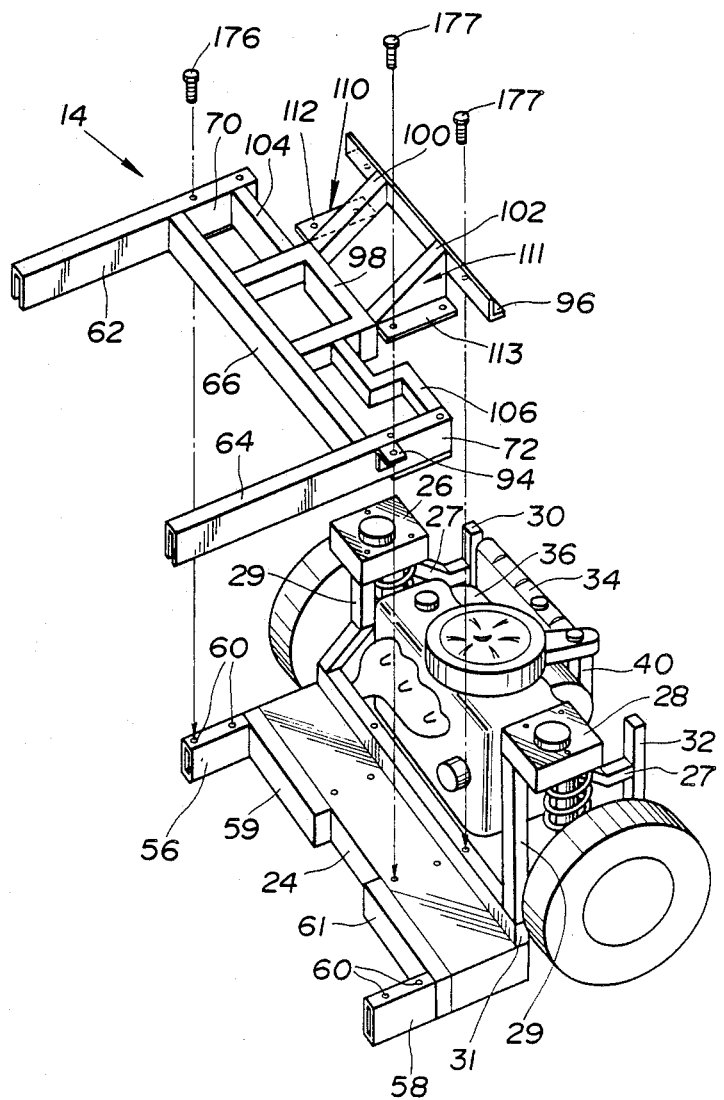
FIG. 2 is a fragmentary perspective view of the vehicle frame of FIG. 1 with respect to a different picture plane.
Figure 3:
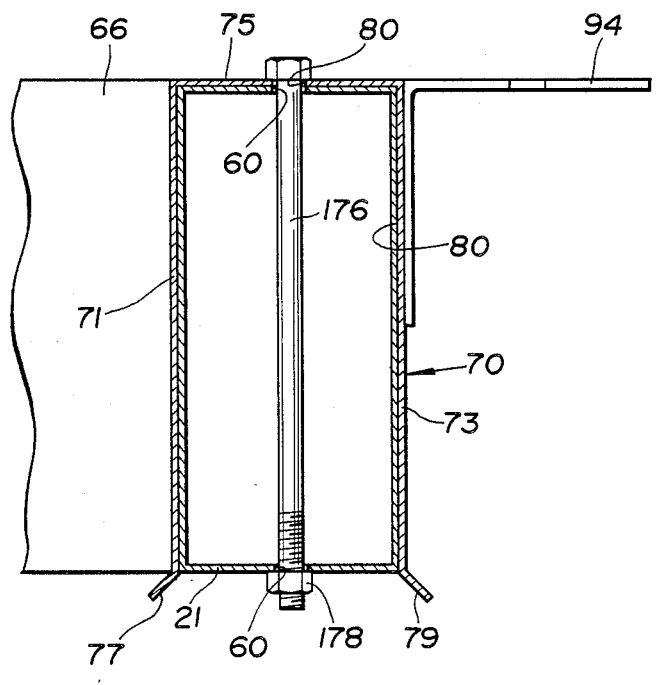
FIG. 3 is a sectional view taken along the line III—III of FIG. 1 when the vehicle frame is in an assembled state.

Referring to FIGS. 1 to 3, a vehicle underbody frame or chassis frame is generally indicated by the reference numeral 10 and consists of three longitudinally separate sections, i.e., a front frame section 12, center frame section 14 and a rear frame section 16. The frame sections 12, 14 and 16 are manufactured and assembled at the respective independent lines, and then painted and equipped with chassis sub-assemblies independently. Thereafter, the frame sections 12, 14 and 16 are joined together to constitute the complete vehicle frame 10.

The front frame section 12 mainly consists of a pair of left and right longitudinal members 18 and 20 and a pair of front and rear cross members 22 and 24. The longitudinal members 18 and 20 are parallel to each other and spaced apart a predetermined distance in the longitudinal direction of the vehicle frame 10. The front cross member 22 extends between the front end portions of the longitudinal members 18 and 20 and secured thereto by welding whilst the rear cross member 24 extends between the rear end portions of the longitudinal members 18 and 20 and secured thereto by welding. A pair of left and right strut holders 26 and 28 are respectively disposed between the laterally opposed end portions of the rear cross member 24 and a pair of left and right post members 30 and 32, and secured to same by way of front side stays 27 and rear side stays 29, respectively. As best seen from FIG. 2, the rear side stays 29 are secured at the lower ends thereof to a platform member 31 which is in turn secured to the rear cross member 24. The platform member 31 is elongated laterally of the vehicle frame 10 and for the rearson as will be explained hereinlater, located at the front end of the rear cross member 24. The post members 30 and 32 extend upwardly from the junctions of the opposite ends of the front cross member 22 and the longitudinal members 18 and 20 and secured thereto by welding. A pair of brackets, though only one 33 is shown, are respectively secured to the laterally outer sides of the post members 30 and 32.

The front frame section 12 is equipped with chassis sub-assemblies as a radiator 34, engine 36, front axle unit 38, steering gear and linkage assembly (not shown), etc. prior to assembly of the frame sections 12, 14 and 16. More specifically, the radiator 34 is disposed between one 30 of the post members and another post member 40 to be installed thereon. The post member 40 is located between the post members 30 and 32, and extends upwardly from the front cross member 22 and secured to same by welding. The engine 36 is installed on the longitudinal members 18 and 20 by way of engine mounting brackets (not shown). The front axle unit 38 includes a pair of drive shafts, though only one 42 is shown, each connected via a transaxle 44 to the engine 36. A pair of front wheels 46 and 48 are carried on the drive shafts 42 by way of front brakes, though only one 49 is shown. The axle unit 38 is installed on the front frame section 12 by way of front suspensions 50 and 51. The front suspensions 50 and 51 include strut assemblies 52 and 54 which are supported at the upper ends thereof upon the strut holders 26 and 28 by way of insulators (not shown).

The front frame section 12 have center frame connecting brackets 56 and 58 at the rear end thereof. The connecting brackets 56 and 58 are in the form of a rectangular tube or pipe and secured to the laterally opposed end portions of the rear cross member 24 by way of connecting arms 59 and 61. The connecting arms 59 and 61 are elongated laterally of the vehicle frame 10 and secured at the laterally inner ends thereof to the opposite end portions of the rear cross member 24. The brackets 56 and 58 are respectively secured to the laterally outer end portions of the connecting arms 59 and 61 to project rearwardly therefrom. As best seen from FIG. 3, the connecting brackets 56 and 58 are formed with a plurality of bolt holes 60 extending through the upper and lower walls thereof, respectively.

The center frame section 14 includes a pair of left and right longitudinal members 62 and 64 and a pair of front and rear cross members 66 and 68. The longitudinal members 62 and 64 are spaced apart a predetermined distance in the lateral direction of the vehicle frame 10. The front cross member 66 extends between the front end portions of the left and right longitudinal members 62 and 64 and secured thereto by welding whilst the rear cross member 68 extends between the rear end portions of same and secured thereto by welding.

The center frame section 14 has at the front end thereof front frame connecting brackets 70 and 72 and at the rear end thereof rear frame connecting brackets 74 and 76. The front frame connecting brackets 70 and 72 are constituted by the front end portions of the longitudinal members 62 and 64 or so formed as to constitute the front end extensions of the longitudinal members 62 and 64. The connecting brackets 70 and 72 have chambers 78 for fittingly receiving therewithin the connecting brackets 56 and 58 of the front frame section 12 and a plurality of bolt holes 80 adapted to be respectively matched with the bolt holes 60. In other words, the connecting brackets 70 and 72 have an inverted U-like cross section and are adapted to fit on the connecting brackets 56 and 58 of the front frame section 12, respectively. The bolt holes 80, as seen from FIG. 3, are so arranged as to be respectively aligned with the bolt holes 60 when the front and center frame sections 12 and 14 assume predetermined relative positions. More specifically, as shown in an enlarged scale in FIG. 3, the connecting brackets 70 and 72 each include a pair of upstanding side walls 71 and 73 and an upper end wall 75 extending between the side walls 71 and 73. The side walls 71 and 73 have at the lower ends thereof flanges 77 and 79 extending downwardly and outwardly so that the connecting brackets 56 and 58 are inserted into the chambers 78 under the guide of the flanges 77 and 79.

The connecting brackets 74 and 76 at the rear end of the center frame section 14 are shaped similarly to the front frame connecting brackets 70 and 72 and formed with chambers 86 and a plurality of bolt holes 88. The chambers 86 are adapted to fittingly receive therewithin center frame connecting brackets 90 and 92 of the rear frame section 16, i.e., the rear frame connecting brackets 74 and 76 have an inverted U-like cross section and are adapted to fit on the the connecting brackets 90 and 92. A plurality of brackets 94 are provided to the longitudinal members 62 and 64 to project laterally outwardly therefrom for installation of a vehicle body which will be described hereinlater with reference to FIG. 5.

The center frame section 14 has another front frame connecting bracket 96 which projects forwardly from the front cross member 66. The bracket 96 is elongated laterally of the vehicle frame 10 and secured to the front cross member 66 by way of a frame member 98 of a U-like configuration and a pair of slanting arm members 100 and 102. The frame member 98 is secured to the central portion of the front cross member 66 in such a way as to project forwardly therefrom. The frame member 98 is supported upon the connecting brackets 70 and 72 by way of beam members 104 and 106. The beam member 106 has a crank-like shape so as to define on the side of the frame member 98 a space 108 through which a steering shaft (not shown) is to extend. The arm members 100 and 102 project forwardly and upwardly from the frame member 98 and interconnect the bracket 96 and the frame member 98. A pair of triangular plate members 110 and 111, as best seen from FIG. 2, are secured to the outer sides of the arm members 100 and 102, respectively. The triangular plate members 110 and 111 have flanges 112 and 113 projecting laterally outwardly from the bottom edges thereof. The bracket 96 is adapted to be placed on the platform member 31 whilst the flanges 112 and 113 are placed directly on the rear cross member 24. In case of assembly of the front and center frame sections 12 and 14, the bracket 96 and flanges 112 and 113 are bolted to the platform member 31 and the rear cross member 24, respectively.

In the foregoing, it is to be noted that the place where the bracket 96 is connected with the platform member 31 is located higher and more forward than the places where the connecting brackets 70 and 72 and the flanges 112 and 113 are connected with the the connecting brackets 56 and 58 and the rear cross member 24, respectively. Accordingly, when viewed from the front end of the vehicle frame 10, the above places of connections are arranged in an inverted U-like array. This is quite effective for attaining rigid connection between the front and center frame sections 12 and 14.

It is further to be noted that the place where the bracket 96 and platform 31 are joined is located more forward than the places where the brackets 56, 58, 70 and 72, are joined. In other words, the bracket 96 is so disposed as to extend forwardly beyond the rear end of the front frame section 12 and project far into the front frame section 12. In this connection, it is desirable from the point of view of rigid connection to connect the bracket 96 to a portion of the front frame section 12 which is located as forwardly as possible of the vehicle frame 10 or as close as possible to the forward end of the front frame section 12.

Though not shown, the center frame section 14 is equipped with chassis sub-assemblies as an exhaust system, etc. prior to assembly of the frame sections 12, 14 and 16.

The rear frame section 16 includes a pair of left and right longitudinal members 114 and 116 spaced apart a predetermined distance in the longitudinal direction of the vehicle body, parallel three front cross members 118, 120 and 122 extending between the forward end portions of the longitudinal members 114 and 116 and secured thereto by welding, an intermediate cross member 124 extending between the longitudinally intermediate portions of the longitudinal members 114 and 116 and secured thereto by welding, a rear cross member 126 extending between the rear end portions of the longitudinal members 114 and 116 and secured thereto by welding, and a pair of left and right strut holders 128 and 130. The rear frame section 16 is equipped with chassis sub-assemblies as a rear axle unit 132, etc. prior to assembly of the frame sections 12, 14 and 16. The rear axle unit 132 includes a pair of left and right axle shafts, though only one 134 is shown on which a pair of left and right rear wheels 136 and 138 are carried. The axle unit 132 is installed on the rear frame section 16 by way of left and right rear suspensions 140 and 142. The rear suspensions 140 and 142 each include suspension arms 144 and 146 attached to the front cross members 118, 120 and 122 via brackets 148, struts 150 and 152 attached at the upper ends thereof to the strut holders 128 and 130 via insulators (not shown) and coil springs, though only one 154 is shown, of which upper ends are retained by spring adaptors 158 and 160. The strut holders 128 and 130 are respectively installed on the longitudinal members 114 and 116 by means of left and right post members 162 and 164 and an upper cross member 166 interconnecting the upper end portions of the post members 162 and 164. The front cross members 118, 120 and 122 and intermediate cross member 124 are interconnected by a plurality of rib-like longitudinal members 168.

The center frame connecting brackets 90 and 92 at the front end of the rear frame section 16 are shaped similarly to the center frame connecting brackets 56 and 58 of the front frame section 12 and constituted by the forward end portions of the longitudinal members 114 and 116 or so formed as to constitute the forward end extensions of the longitudinal members 114 and 116. The distance between the connecting brackets 90 and 92 is equal to that between the connecting brackets 56 and 58. The connecting brackets 90 and 92 are formed with a plurality of bolt holes 174 adapted to be aligned with the bolt holes 88 formed in the brackets 74 and 76 of the center frame section 14.

With the foregoing structure, the vehicle frame 10 can be obtained by first locating the front and rear frame sections 12 and 16 in the places spaced apart a predetermined distance, then locating the center frame section in such a way that the front end connecting brackets 70 and 72 are fitted on the rear end connecting brackets 56 and 58 of the front frame section 12, with the bracket 96 and flanges 112 and 113 being respectively placed on the platform member 31 and the rear cross member 24, and that the rear end connecting brackets 74 and 76 are fitted on the front end connecting brackets 90 and 92 of the rear frame section 16 and finally fastening with bolts 176 and nuts 178 the connecting brackets 70, 72 and 74, 76 to the connecting brackets 56, 58 and 90 and 92, respectively. The bracket 96 and the triangular plates 110 and 111 are then bolted 177 to the platform member 31 and the rear cross member 24, respectively. The front, center and rear frame sections 12, 14 and 16 are manufactured and assembled in the respective independent lines and then painted and equipped with chassis sub-assemblies independently.

From the foregoing, it will be understood that according to the present invention the vehicle frame 10 is formed from three independent frame sections, i.e., the front frame section 12, center frame section 14 and the rear frame section 16. These three frame sections 12, 14 and 16 are manufactured, assembled, painted and equipped with chassis sub-assemblies independently and finally joined together to constitute a complete vehicle chassis. In this connection, it will be understood that the frame sections 12, 14 and 16 are equipped with the chassis sub-assemblies to constitute modules which are assembled into a vehicle chassis, i.e., according to the present invention a vehicle chassis consists of three frame modules 12, 14 and 16 which are fastened together with bolts. This structure is quite effective for overcoming the foregoing disadvantages and shortcomings inherent in the prior art devices. For example, with this structure, chassis sub-assemblies can be installed on each frame section or module with ease and efficiency since access to the spaces in which the sub-assemblies are to be disposed can be done from any sides of the module, i.e., all-around acess to the spaces can be attained. Assembly using robots thus can be attained with ease. Further, inspection of the chassis sub-assemblies after its installation on the modules can be done with ease and efficiency at any work area, e.g., at an off-line space. Therefore, not only installation but inspection and replacement of the chassis sub-assemblies can be done with ease and efficiency. Further, the modules can be produced at the respective work areas which are far distant from each other and then gathered at one place for assembly. In this instance, conveyance or transportation of the modules can be done with each since they are smaller in size as compared with the complete vehicle frame 10 and can be wrapped into a smaller package.

Figure 4:
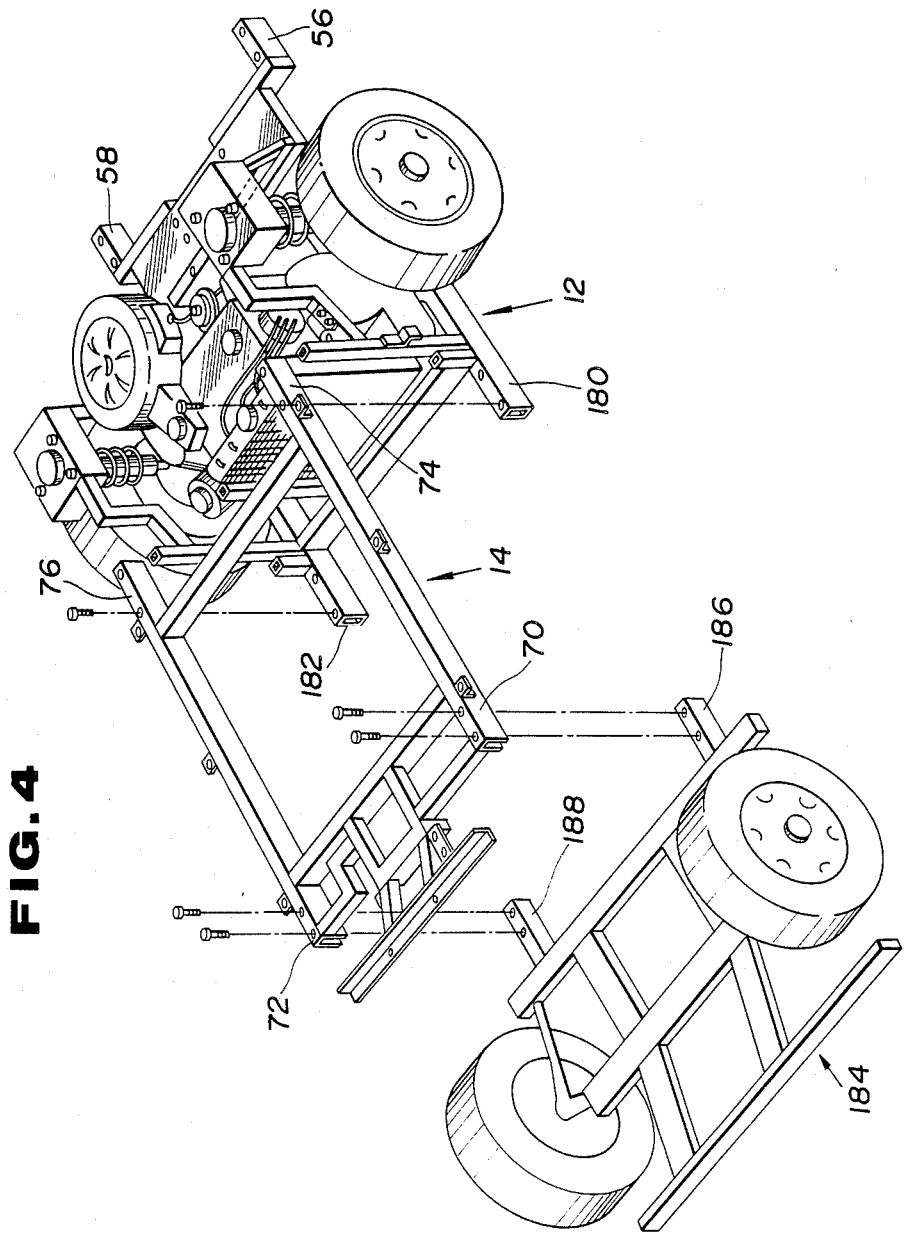
FIG. 4 is a view similar to FIG. 1 but showing a modification according to the present invention.

FIG. 4 shows a modified embodiment of the present invention. In this embodiment, the front frame section 12 of FIG. 1 is used as a rear frame section for attaining a frame for a vehicle of the type installing an engine at the rear. To this end, the frame section 12 further has connecting brackets 180 and 182 at the front end thereof. The connecting brackets 180 and 182 are shaped similarly to the connecting brackets 56 and 58. A new front frame section 184 is formed with a pair of center frame connecting brackets 186 and 188 which are constructed and arranged similarly to the connecting brackets 56 and 58 of the front frame section 12.

From this embodiment, it will be understood that various versions of front, center and rear frame sections or modules can be prepared and combined variously to obtain various kinds of vehicle frames or chassis. Accordingly, various kinds of vehicles can be produced with ease and efficiency according to the present invention.

Figure 5:
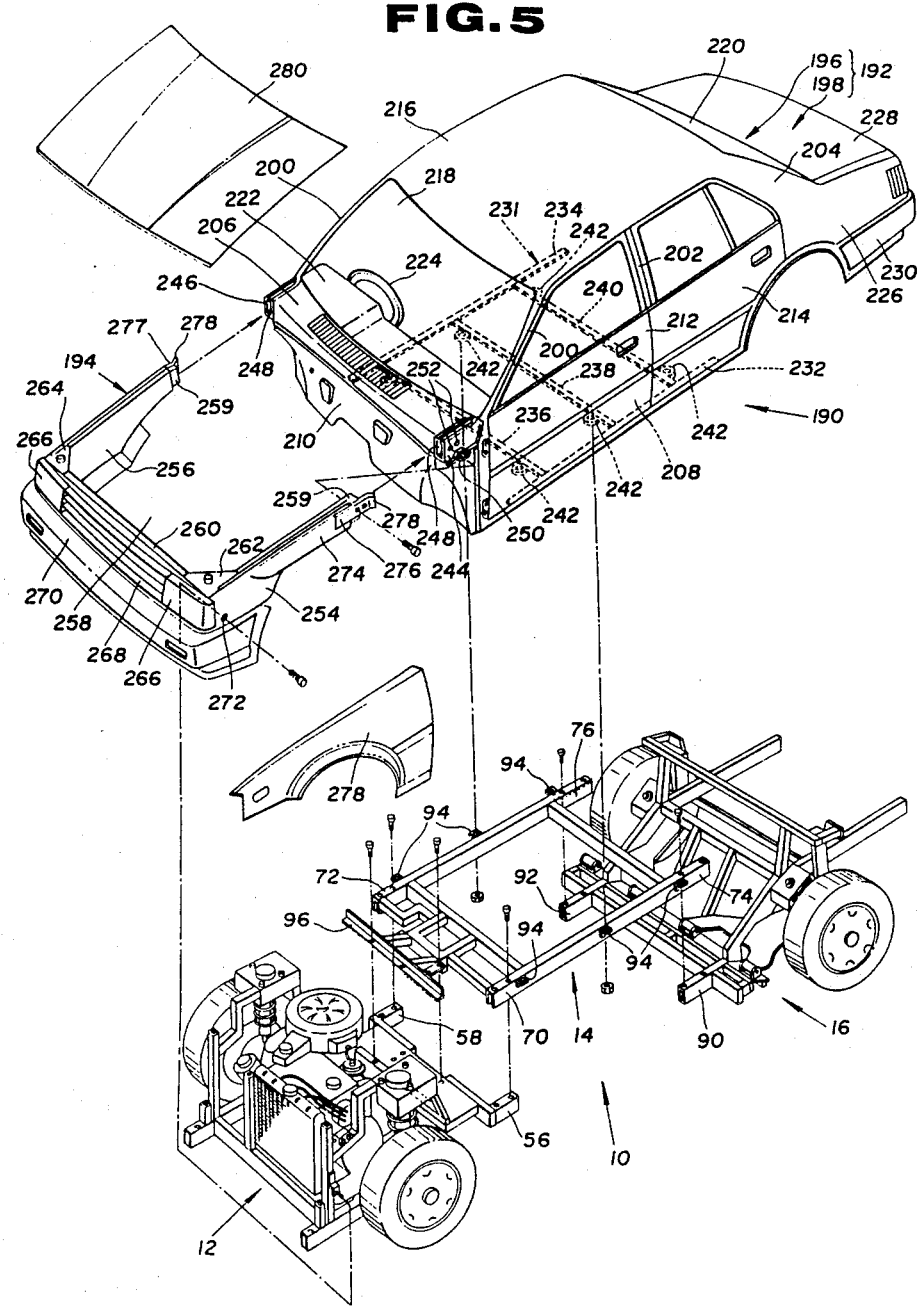
FIG. 5 is a perspective, partly exploded view of a vehicle structure according to another embodiment of the present invention.

FIG. 5 shows a vehicle structure consisting of the foregoing vehicle frame 10 and a vehicle body 190 adapted for installation thereon. The vehicle body 190 consists of two independent body sections, i.e., a combined passenger and luggage compartment body section 192 and an engine compartment body section 194. The body section 192 is adapted to constitute a passenger compartment 196 and a luggage compartment 198 as a unit. The passenger compartment 196 is constituted by rigid frame members as front pillars 200, center pillars 202, rear pillars 204, cowl box or air box 206, etc. and panel members as a floor panel 208, dash panel 210, front doors 212, rear doors 214, roof panel 216, windshield 218, rear window 220, etc. Within the passenger compartment 196, upholsteries and mechanical parts as an instrument panel 222, steering wheel 224, etc. are disposed.

The luggage compartment 198 is constituted by a rear fender panel 226, trunk lid 228, rear end panel (not shown), etc. and partly surrounded by a rear bumper 230. A framework 231 is welded to the lower side of the floor panel 208. The framework 231 consists of a pair of longitudinal members 232 and 234 and three parallel cross members 236, 238 and 240 extending between the longitudinal members 232 and 234 and secured thereto by welding. The cross members 236, 238 and 240 have secured thereto a plurality of brackets 242 to which bolts (not shown) are welded to project downwardly therefrom. The brackets 242 are adapted to be aligned with the brackets 94 secured to the longitudinal members 62 and 64 of the center frame section 14 so that the bolts (not shown) secured to the brackets 242 extend through the bolt holes (no numeral) formed in the brackets 94.

The passenger and luggage compartment section 192 has at the opposite ends of the cowl box 206 a pair of connecting brackets 244 and 246 which are formed with chambers 248 opening to the outside at the forward ends thereof. The brackets 244 and 246 have laterally outer side walls formed with drain holes 250 for drainage of the chambers 248. The laterally outer side walls of the connecting brackets 244 and 246 are also formed with a plurality of bolt holes 252.

The engine compartment section 194 includes a pair of hood ledge panels 254 and 256 serving as laterally opposed side walls of the engine compartment 258. The hood ledge panels 254 and 256 have at the rear ends thereof joggle portions 259 fittingly insertable into the chambers 248 of the connecting brackets 244 and 246. The hood ledge panels 254 and 256 are attached at the forward end portions thereof to a front end panel 260 by way of a pair of triangular corner plates 262 and 264. The front end panel 260 installs thereon a head lamp unit 266, front grille 268 and a front bumper 270. The hood ledge panels 254 and 256 are formed with bolt holes 272 at the forward end portions thereof. A pair of reinforcements, though only one 274 is shown, are secured to the outer side surfaces of the hood ledge panels 254 and 256, respectively. The reinforcements 274 are secured at the rear ends to plates 276 and 277. The plates 276 and 277 each have bolt holes and a rear end portion bent to extend laterally outwardly and rearwardly to form a flange 278. A pair of front fender panels, though only one 278 is shown, are attached to the outer side surface of the reinforcements 274. An engine hood 280 is installed in the conventional manner to open and close the engine compartment 258.

The passenger and luggage compartment section 192 and engine compartment section 194 are manufactured and assembled in the respective independent lines. Thereafter, the compartment sections 192 and 194 are painted and equipped with components independently.

The passenger and luggage compartment section 192 is then installed on the center and rear frame sections 14 and 16 of the vehicle frame 10 in such a way that the bolts (not shown) welded to the brackets 242 at the lower face of the floor panel 208 are inserted into the bolt holes formed in the brackets 94 of the center frame section 14 to extend downwardly therethrough. The brackets 242 are then bolted to the brackets 94, whereby to fasten the body section 192 to the vehicle frame 10. The engine compartment body section 258 is manufactured, assembled, painted and equipped with components in its own independent line. Thereafter, the joggle portions 259 of the engine compartment body section 258 are inserted into the connecting brackets 244 and 246 at the opposite ends of the cowl box 206 and secured to same by bolting the plates 276 and 277 to the brackets 244 and 246. Bolts (no numeral) are inserted into the bolt holes 252 and screwed into the brackets 33 of the post members 40 and 42. Thereafter, the front fender panels 278 are bolted or otherwise secured to the hood ledge panels 254 and 256. Finally, the engine hood 280 is installed by using a suitable hinge means (not shown).

From the foregoing, it is to be understood that various versions of engine compartment body section and passenger and luggage compartment body section can be prepared based on various versions of vehicle frame sections to attain various kinds of vehicles with ease and efficiency.

What is claimed is:

1. A method for assembling a chassis structure for a vehicle comprising:
   providing a front frame module having a front frame section with bracket means at the rear end thereof;
   providing a rear frame module having a rear frame section with bracket means at the front end thereof;
   installing chassis sub-assemblies including an engine, wheels and a suspension system in said front frame module;
   installing chassis sub-assemblies including wheels and a suspension system in said rear frame module;
   interposing a center frame module having a center frame section between said front and rear frame modules, said center frame section having at the front and rear ends thereof bracket means respectively associated with said bracket means at the rear and front ends of said front and rear frame sections; and
   mechanically fastening said bracket means of said center frame module to said bracket means of said front and rear frame modules.

2. A chassis structure for a vehicle comprising:
   a front frame module having a front frame section and chassis sub-assemblies including an engine, wheels and a suspension system, said front frame section having at the rear end thereof bracket means;
   a rear frame module having a rear frame section and chassis sub-assemblies including wheels and a suspension system, said rear frame section having at the front end thereof bracket means;
   a center frame module having a center frame section and interposed between said front and rear frame modules, said center frame section having at the front and rear ends thereof bracket means respectively joined with said bracket means at the rear and front ends of said front and rear frame sections; and mechanical fastening means for mechanically and vertically fastening said bracket means of said center frame module to said bracket means of said front and rear frame modules;

said bracket means of said front frame module having a first pair of brackets in the form of a rectangular tube and extending longitudinally of the chassis structure;

said bracket means of the front end of said center frame sections being a second pair of brackets having an inverted U-like cross section and fitted on said first pair of brackets;

said front frame section having a pair of longitudinal members and a pair of front and rear cross members, said center frame section having a pair of longitudinal members and a pair of front and rear cross members, said first pair of brackets being provided to said rear cross member of said front frame section to project rearwardly therefrom, said second pair of brackets being respectively provided to said longitudinal members of said center frame section to project forwardly therefrom;

said bracket means of the front end of said center frame module further having a laterally elongated bracket supported upon said front cross member of said center frame section, said front frame section having a platform member which is located more forward and higher than said first pair of brackets, said laterally elongated bracket being fastened to said platform member by said mechanical fastening means.

3. A chassis structure as set forth in claim 2 wherein said bracket means of said center and rear frame modules comprise a third pair of brackets in the form of a rectangular tube and extending longitudinally of the vehicle chassis and a fourth pair of brackets having an inverted U-like cross section and fitted on said third pair of brackets.

4. A chassis structure as set forth in claim 3 wherein said rear frame section includes a pair of longitudinal members and a plurality of cross members, said third pair of brackets being provided to said longitudinal members of said rear frame section to project forwardly therefrom, said fourth pair of brackets being provided to said longitudinal members of said center frame section to project rearwardly therefrom.

5. A chassis structure as set forth in claim 4 wherein said mechanical fastening means comprises a plurality of bolts and nuts.

6. A chassis structure as set forth in claim 5 wherein each of said brackets in the form of a rectangular tube having a pair of vertically opposed walls which are formed with bolt holes, each of said brackets of an inverted U-like cross section having a pair of upstanding walls and an upper wall extending between said upstanding walls, said upper wall having bolt holes alinged with said bolt holes of brackets in the form of a rectangular pipe, said upstanding walls having flanges extending downwardly and laterally outwardly therefrom.

7. A method of producing a vehicle structure comprising:
providing a front frame module having a front frame section with a bracket means at the rear end thereof;
providing a rear frame module having a rear frame section with bracket means at the front end thereof;
installing chassis sub-assemblies including an engine, wheels and a suspension system in said front frame module;
installing chassis sub-assemblies including wheels and a suspension system in said rear frame module;
interposing a center frame module having a center frame section and interposed between said front and rear frame sections, said center frame section having at the front and rear ends thereof bracket means respectively joined with said bracket means at the rear and front ends of said front and rear frame sections;
mechanically fastening said bracket means of said center frame module to said bracket means of said front and rear frame modules; and
installing a body on said front, center and rear frame sections.

8. The method as set forth in claim 7 wherein said body comprises a passenger and luggage compartment body section and an engine compartment body section which are independent from each other, said passenger and luggage compartment body section having a cowl box and a pair of socket-like brackets at the opposite ends of said cowl box, said engine compartment having a pair of hood ledge panels and a pair of joggle members projecting rearwardly from said hood ledge panels into said socket-like brackets, mechanical fastensing means for mechanically fastening said joggle members to said socket-like brackets.

9. The method as set forth in claim 8 wherein said passenger and luggage compartment body section comprises a floor panel and a frame work secured to said floor panel and having bracket means, said center frame section further having bracket means joined with said bracket means of said framework and fastened to same by means of said mechanical fastening means.

10. A method of producing a chassis for an automotive vehicle comprising:
preparing front, center and rear frame sections which are separate from each other;
painting said front, center and rear frame sections;
installing chassis sub-assemblies on said front, center and rear frame sections;
mechanically fastening said front, center and rear frame sections to each other.

11. A method as set forth in claim 10 wherein said preparing of said frame sections is performed in their respective independent lines.

12. A method as set forth in claim 11 wherein said painting of said frame sections is performed independently.

13. A method as set forth in claim 12 wherein said installing of said chassis sub-assemblies on said frame sections is performed in their respective independent lines.

* * * * *